United States Patent
Kikuchi et al.

(10) Patent No.: US 6,822,406 B2
(45) Date of Patent: Nov. 23, 2004

(54) BRUSHLESS MOTOR DRIVING CIRCUIT AND PORTABLE TERMINAL INCORPORATING THE SAME

(75) Inventors: Masafumi Kikuchi, Kanagawa (JP); Hitoshi Suzuki, Kanagawa (JP); Masahiro Suzuki, Kanagawa (JP); Akira Fujino, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 10/209,622

(22) Filed: Aug. 1, 2002

(65) Prior Publication Data

US 2003/0034704 A1 Feb. 20, 2003

(30) Foreign Application Priority Data

Aug. 14, 2001 (JP) .................................... P2001-245893

(51) Int. Cl.[7] .................................................. H02P 7/00
(52) U.S. Cl. .......................... 318/114; 310/80; 310/81; 318/778; 318/254
(58) Field of Search ..................... 310/80, 81; 318/254, 318/778, 114

(56) References Cited

U.S. PATENT DOCUMENTS

| | | | | |
|---|---|---|---|---|
| 4,449,086 A | * | 5/1984 | Hoffmann et al. | .......... 318/696 |
| 5,204,594 A | * | 4/1993 | Carobolante | ................. 318/254 |
| 5,225,759 A | * | 7/1993 | Endo et al. | .................. 318/778 |
| 5,382,886 A | * | 1/1995 | Mizuide | ...................... 318/254 |
| 6,057,753 A | * | 5/2000 | Myers | .......................... 310/81 |
| 6,153,993 A | * | 11/2000 | Oomura et al. | ............. 318/434 |
| 6,583,593 B2 | * | 6/2003 | Iijima et al. | ................. 318/254 |

FOREIGN PATENT DOCUMENTS

JP          2892164       2/1999

\* cited by examiner

*Primary Examiner*—Karl Tamai
*Assistant Examiner*—Yahveh Comas
(74) *Attorney, Agent, or Firm*—Rader, Fishman & Grauer PLLC; Ronald P. Kananen

(57) ABSTRACT

A brushless motor-driving circuit is disclosed which includes an initializing element setting an initial rotating speed, an oscillating element for generating a frequency corresponding to the initial rotating speed set by the initializing element, a frequency-controlling element for causing the frequency generated by the oscillating element to change from the frequency corresponding to the initial rotating speed to a frequency corresponding to a constant rotating speed, a driving-signal-generating element for generating driving signals having a plurality of phases based on the generated frequency of the oscillating element, and a driving element for driving coils having a plurality of phases based on the driving signals having the plurality of phases generated by the driving-signal-generating element.

9 Claims, 6 Drawing Sheets

BRUSHLESS MOTOR DRIVING CIRCUIT AND PORTABLE TERMINAL INCORPORATING THE SAME

BACKGROUND OF THE INVENTION

The present invention relates to a brushless motor-driving circuit and a portable terminal incorporating this circuit. More particularly, the invention relates to a driving circuit of a so-called sensorless-type brushless motor having no position sensor for detecting the rotating position of a rotor and a portable terminal exemplified by a portable telephone incorporating such a brushless motor-driving circuit.

There has been disclosed a sensorless-type brushless motor-driving circuit designed to generate a power on/off signal upon detection of a counter-electromotive voltage in a motor-driving coil during a power-off period. This type of circuit forms a phase-control loop or a speed-control loop in a manner maintaining a constant phase relation or a steady speed relation, thereby driving a brushless motor without recourse to position sensors (as disclosed in Japanese Patent No. 2892164).

The sensorless-type brushless, motor-driving circuit above uses a phase-detection amplifier (corresponding to the power logic detector in the above-cited patent) to detect the phase of a counter-electromotive voltage generated by coils having different phases during constant revolutions (the phase of the counter-electromotive voltage represents a point of changeover to a median voltage). The phase-detection provides a basis for determining when to turn on the next output stage. Where there is a fluctuation in motor load leading to changes of the phase of the counter-electromotive voltage, the rotating speed is controlled correspondingly so that the brushless motor is driven in a stable manner. Since there is no need for position sensors, this brushless motor-driving circuit is small, inexpensive, and used extensively in rotation-driving applications today.

One disadvantage of the sensorless-type brushless motor-driving circuit above is that it is vulnerable to noises generated by the motor itself and noises produced by peripheral IC components operating on the same power-supply line as the driving circuit. Such noises can hinder the phase-detection amplifier from correctly detecting the phase of the counter-electromotive voltage.

To suppress the adverse effects of these noises requires installing noise filters each made up illustratively of a capacitor and a resistor upstream and downstream of the phase-detection amplifier and with regard to each of the phases involved. A high level of offset accuracy is required of the phase-detection amplifier. Where the driving circuit is to be implemented in IC form, the components (capacitor and resistor) corresponding to each of the phases constituting the filter upstream of the phase-detection amplifier need to be attached externally. This means there must be more components to be connected externally to the IC package. The filter downstream of the phase-detection amplifier needs to be incorporated in the IC chip. The circuit structure thus becomes complicated and results in a greater required circuit area.

To detect the phase of the counter-electromotive voltage obviously requires installing the phase-detection amplifier. When the driving circuit is implemented in IC form, an extensive chip area must be devoted to such circuits as the phase-detection amplifier and a driving waveform generator using that amplifier.

SUMMARY OF THE INVENTION

It is an object of the present invention to provide a brushless motor-driving circuit of an appreciably simplified circuit structure capable of stable rotation drive free from the adverse effects of noises generated by the motor itself or by peripheral IC components operating on the same power-supply line as the driving circuit and a portable terminal incorporating such a brushless motor-driving circuit.

In carrying out the invention and according to one aspect thereof, there is provided a brushless motor-driving circuit including: an initializing element setting an initial rotating speed; an oscillating element for generating a frequency corresponding to the initial rotating speed set by the initializing element; a frequency-controlling element for causing the frequency generated by the oscillating element to change from the frequency corresponding to the initial rotating speed to a frequency corresponding to a constant rotating speed; a driving-signal-generating element for generating driving signals having a plurality of phases based on the generated frequency of the oscillating element; and a driving element for driving coils having a plurality of phases based on the driving signals having the plurality of phases generated by the driving-signal-generating element. This brushless motor-driving circuit is used as a motor-driving circuit for driving a vibrating motor in a portable terminal exemplified by a portable telephone. Typically, the portable telephone utilizes the motor-driving circuit to drive the vibrating motor of a vibrator that announces an incoming call through vibrations.

In the brushless motor-driving circuit of the above structure or in the portable terminal incorporating that circuit, the oscillating element outputs, upon activation of the brushless motor, a generated frequency corresponding to the initial rotating speed set by the initializing element. In turn, the driving-signal-generating element generates driving signals having a plurality of phases based on the generated frequency. The driving signals with the plurality of phases allow the driving element to drive coils having a plurality of phases, prompting the brushless motor to start rotating. With the motor thus started, the frequency-controlling element causes the generated frequency to change from the frequency corresponding to the initial rotating speed to a frequency corresponding to a constant rotating speed. Under such a frequency-controlled synchronizing scheme, the motor's revolutions reach the constant rotating speed and stay there.

Other objects, features and advantages of the invention will become more apparent upon a reading of the following description and appended drawings.

DESCRIPTION OF THE PREFERRED EMBODIMENT

Figure 1:
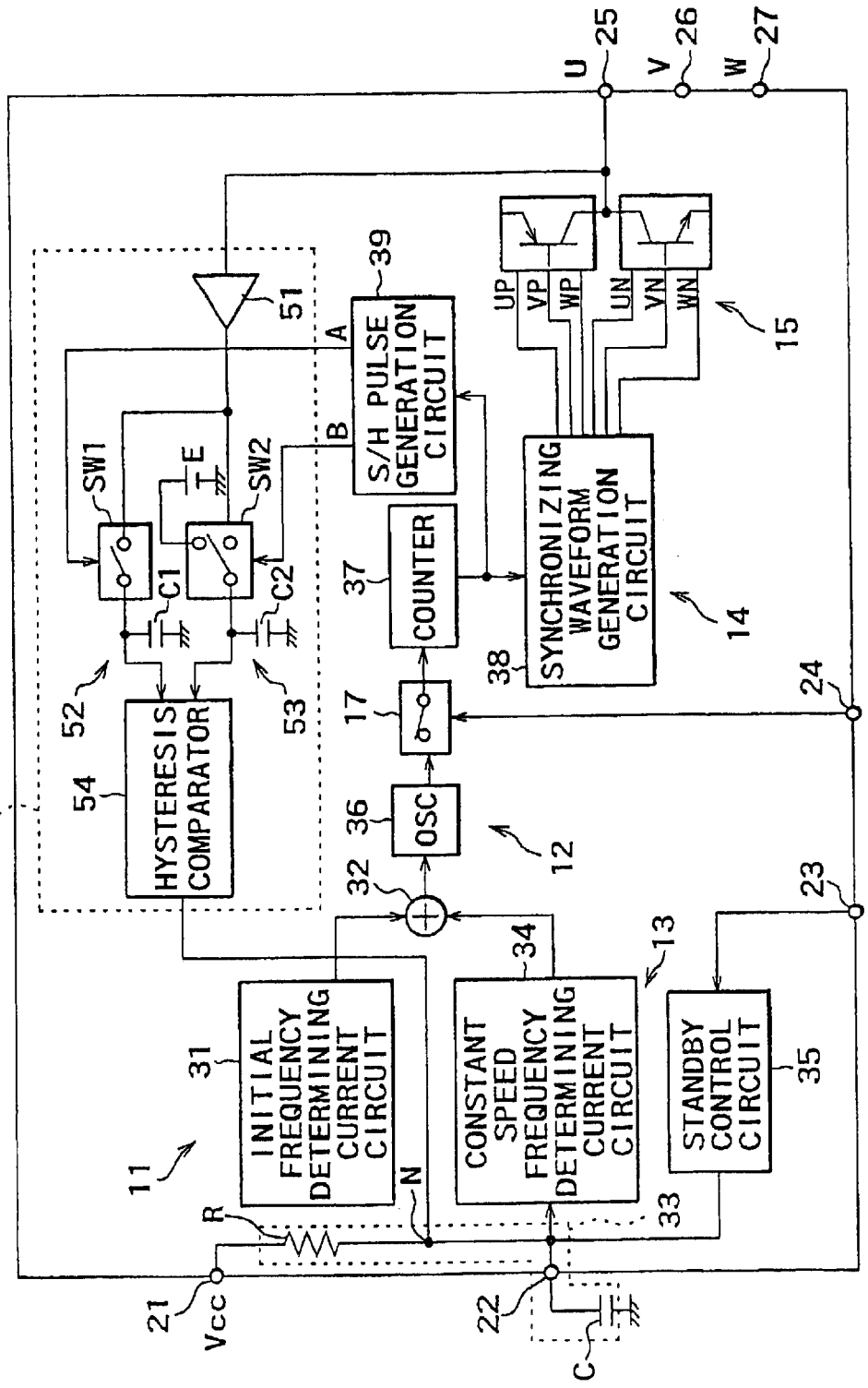
FIG. 1 is a block diagram showing a typical structure of a sensorless-type brushless, motor-driving circuit according to an embodiment of the invention.

Preferred embodiments of this invention will now be described in detail with reference to the accompanying drawings. FIG. 1 is a block diagram showing a typical structure of a sensorless-type, brushless, motor-driving circuit according to the invention.

As shown in FIG. 1, the inventive brushless motor-driving circuit includes: an initialization unit 11 for setting an initial rotating speed; an oscillation unit 12 for generating a frequency corresponding to the initial rotating speed set by the initialization unit 11; a frequency control unit 13 for causing the generated frequency of the oscillation unit 12 to change from the frequency corresponding to the initial rotating speed to a frequency corresponding to a constant rotating speed; a driving-signal-generation unit 14 for generating driving signals having a plurality of phases (e.g., three-phase driving signals) based on the generated frequency of the oscillation unit 12; and a driving unit for driving three-phase coils U, V and W based on the three-phase driving signals. The units 11 through 15 are the basic components of this driving circuit.

Besides its basic components, the brushless motor-driving circuit of the invention includes two additional components: a stop-detection unit 16 for detecting the rotating state of the motor and especially its stopped state; and a braking switch 17 for applying brakes to the motor rotating at constant speed. The inventive brushless motor-driving circuit is illustratively implemented in an IC form having at least seven terminal pins 21 through 27.

The initialization unit 11 is composed of an initial-frequency-determining current circuit 31. This circuit 31 outputs an initial current for determining the initial rotation frequency upon power-up or when the standby mode is canceled. The initial current is supplied to one input of an adder 32 so as to determine the initial rotating speed (low speed) of the motor, as will be described later. The mode in which the motor rotates at the initial rotating speed is called the initial operation mode hereunder.

The frequency control unit 13 is constituted by a time-constant circuit 33 having a predetermined time-constant and by a constant-speed-frequency-determining current circuit 34 that outputs a control current for determining a constant-speed (i.e., high speed) rotation frequency. In the frequency control unit 13, the time-constant circuit 33 is made up of a resistor R and a capacitor C. The resistor R is connected as a built-in IC component between terminal pins 21 and 22, across which a supply voltage Vcc is fed. The capacitor C is connected as an externally-attached IC component between the terminal pin 22 and a reference potential point (e.g., ground). The time-constant is determined by the values of the resistor R and the capacitor C.

Figure 2:
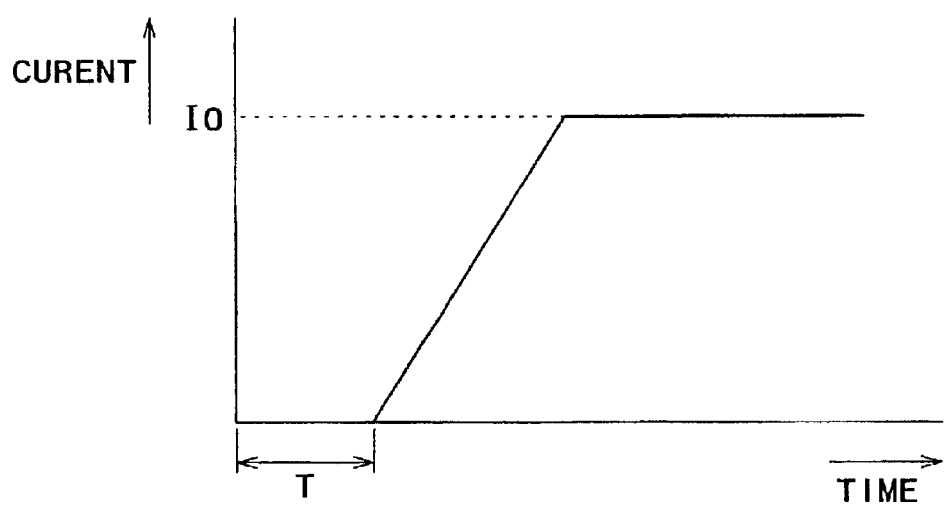
FIG. 2 is a graphic representation indicating an output characteristic of a constant-speed-frequency-determining current circuit.

As shown in FIG. 2, the constant-speed-frequency determining current circuit 34 provides a zero output current during a predetermined period T following a power-up or upon a cancellation of the standby mode. Past the period T, the output current is raised gradually in keeping with the time constant of the time-constant circuit 33. Once the output current levels off at a current IO corresponding to a predetermined constant-speed rotation frequency, the output current is kept constant. The output current (i.e., control current) from the constant-speed-frequency determining current circuit 34 is supplied to the other input of the adder 32 in order to determine the constant rotating speed of the motor, as will be discussed later. The mode in which the motor rotates at the constant rotating speed is called the constant-speed mode hereunder.

A terminal pin 23 is supplied with a standby signal for setting or canceling the standby mode. Fed past the terminal pin 23, the standby signal is forwarded to an internal standby-control circuit 35. When furnished with a standby-on signal (e.g., a High-level signal) as the standby signal to establish the standby mode, the standby-control circuit 35 provides a Low-level output; when supplied with a standby-off signal (e.g., a Low-level signal) as the standby signal to cancel the standby mode, the standby-control circuit 35 leaves its output open.

An addition current from the adder 32 is fed to the oscillation unit 12. The oscillation unit 12 is constituted by an oscillator 36 and a counter 37. The oscillator 36 changes the frequency it generates in keeping with the input current. The counter 37 divides the generated frequency by a predetermined dividing ratio. In the initial operation mode, the oscillator 36 oscillates at a frequency corresponding to the initial current fed from the adder 32. Thereafter, the constant-speed-frequency-determining current circuit 34 outputs a control current causing the oscillator 36 to shift the generated frequency toward a constant-speed rotation frequency. The generated frequency of the oscillator 36 is divided by the counter 37 before being fed to the driving-signal-generation unit 14.

In this embodiment of the invention, the braking switch 17 is installed interposingly between the oscillator 36 and the counter 37. When fed with a braking signal through a terminal pin 24, the braking switch 17 is turned off (i.e., opened) selectively to prevent the oscillator 36 from supplying the frequency signal to the counter 37, thereby braking the motor. This function will be described later in more detail. The braking switch 17 is not limited in its location between the oscillator 36 and the counter 37; the braking switch 17 may alternatively be positioned downstream of the counter 37 or somewhere else, as long as the switch 17 can selectively cut off the supply of the frequency signal to the driving-signal-generation unit 14.

Figure 3:
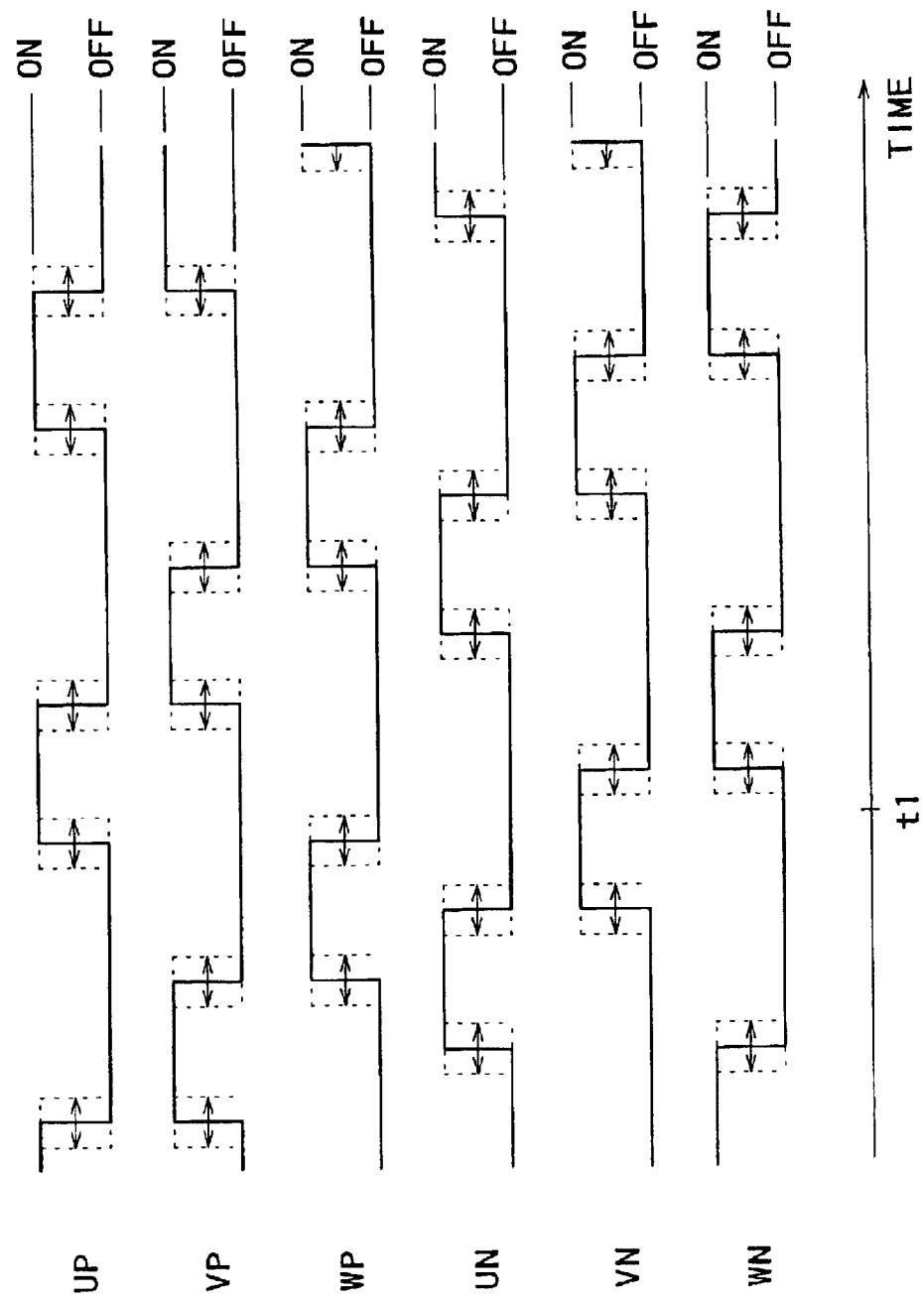
FIG. 3 is a timing chart depicting the timing relations of three-phase, driving-pulse signals UP, VP, WP, UN, VN, and WN.

The driving-signal-generation unit 14 is made up of a synchronizing-waveform-generation circuit 38 and a sample-and-hold (S/H) pulse-generation circuit 39. The synchronizing-waveform-generation circuit 38 generates driving-pulse signals UP, VP, WP, UN, VN and WN based on a clock-pulse signal from the counter 37. The driving-pulse signals used for timing relations, as shown in FIG. 3, are supplied to the driving unit 15. Given the clock-pulse signal from the counter 37, the S/H pulse-generation circuit 39 generates two S/H pulse signals A and B in a predetermined phase relation with each other. Both S/H pulse signals thus generated are fed to the stop-detection unit 16.

Figure 4:
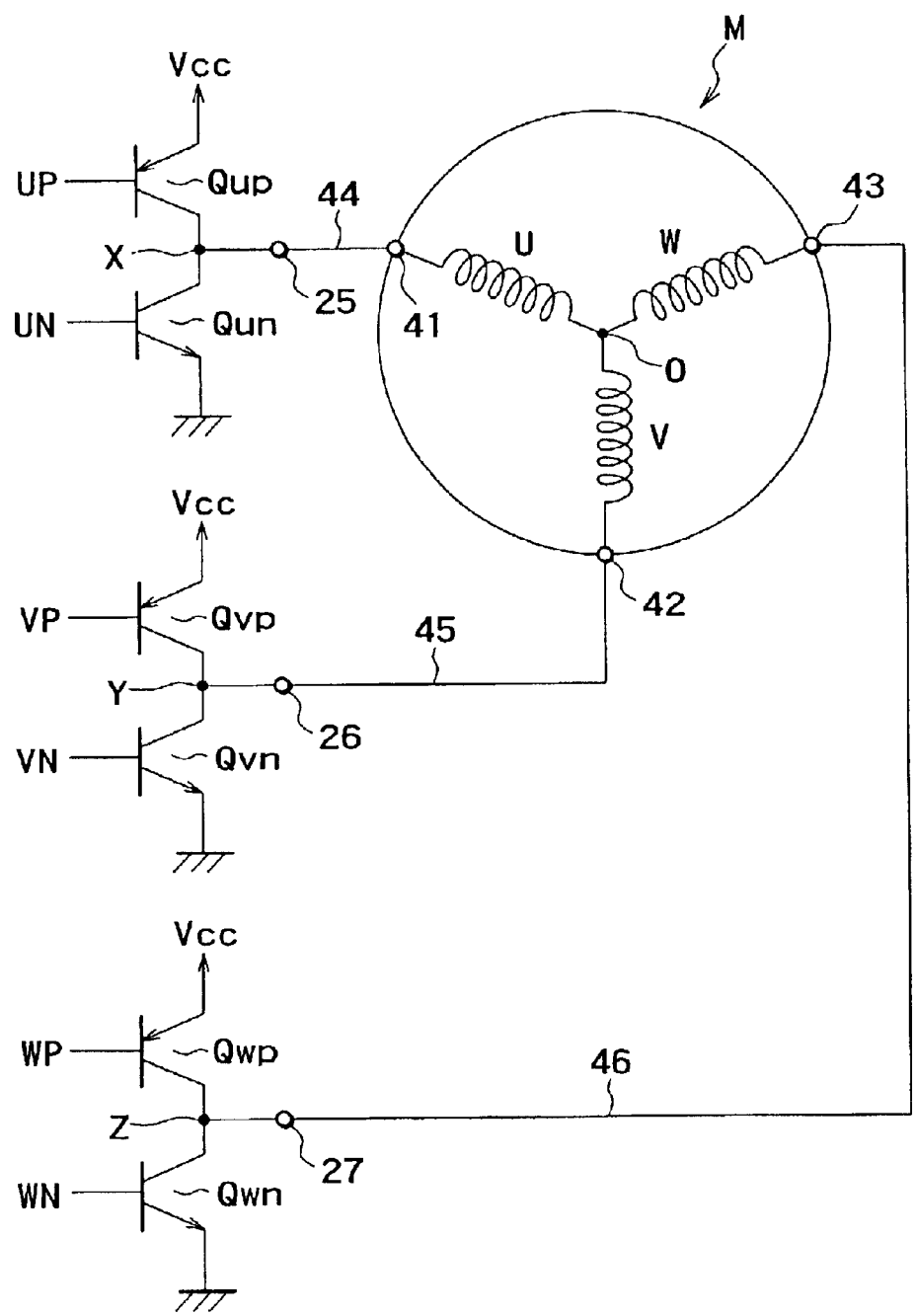
FIG. 4 is a connection diagram illustrating how driving transistors of a driving unit are connected to three-phase coils U, V and W.

As shown in FIG. 4, the driving unit 15 includes: a PNP transistor Qup and a NPN transistor Qun connected in series between the power-supply Vcc and ground, with the driving-pulse signals UP and UN fed as their base input; a PNP transistor Qvp and a NPN transistor Qvn connected in series between the power-supply Vcc and ground, with the driving-pulse signals VP and VN fed as their base input; and a PNP transistor Qwp and a NPN transistor Qwn connected in series between the power-supply Vcc and ground, with the driving-pulse signals WP and WN fed as their base input. A simplified structure of the driving unit 15 is shown in FIG. 1.

In the driving unit 15, a common collector-connection point X of the driving transistors Qup and Qun is connected to a terminal pin 25, a common collector-connection point Y of the driving transistors Qvp and Qvn is connected to a terminal pin 26, and a common collector-connection point Z of the driving transistors Qwp and Qwn is connected to a terminal pin 27. The terminal pins 25, 26 and 27 are connected respectively to coil terminals 41, 42 and 43 through wires 44, 45 and 46.

The stop-detection unit 16 is constituted by a buffer 51, a first and a second S/H circuit 52 and 53, and a hysteresis comparator 54. The buffer 51 has its input terminal connected to one of the three terminal pins 25, 26 and 27 (to the terminal pin 25 in this case), which pins in turn are coupled to the three-phase coils U, V and W. The first S/H circuit 52 is made up of a sampling switch SW1 and a capacitor C1. The sampling switch SW1, with its fixed contact connected to the output terminal of the buffer 51, performs a sampling operation using the S/H pulse signal A from the S/H pulse-generation circuit 36. The capacitor C1 is connected between the moving contact of the sampling switch SW1 and ground.

The second S/H circuit 53 is constituted by a sampling switch SW2 and a capacitor C2. The sampling switch SW2, with one of its two fixed contacts connected to the output terminal of the buffer 51, carries out a sampling operation using the S/H pulse signal B from the S/H pulse-generation circuit 36. The capacitor C2 is connected between the moving contact of the sampling switch SW2 and ground. The other fixed contact of the sampling switch SW2 is fed with a predetermined DC voltage E.

Hold outputs from the first and second S/H circuits 52 and 53, i.e., hold voltages in the capacitors C1 and C2, are fed to the two inputs of the hysteresis comparator 54. Thanks to its hysteresis characteristic, the hysteresis comparator 54 performs comparisons without being affected by noises. In operation, the hysteresis comparator 54 compares the two hold outputs from the first and second S/H circuits 52 and 53. In the event of a substantial coincidence between the two outputs, the hysteresis comparator 54 recognizes a stopped state of the motor (i.e., its rotor) and outputs a Low-level stop-detection signal accordingly. The stop-detection signal is applied to a CR connection node N of the time-constant circuit 33.

Figure 5:
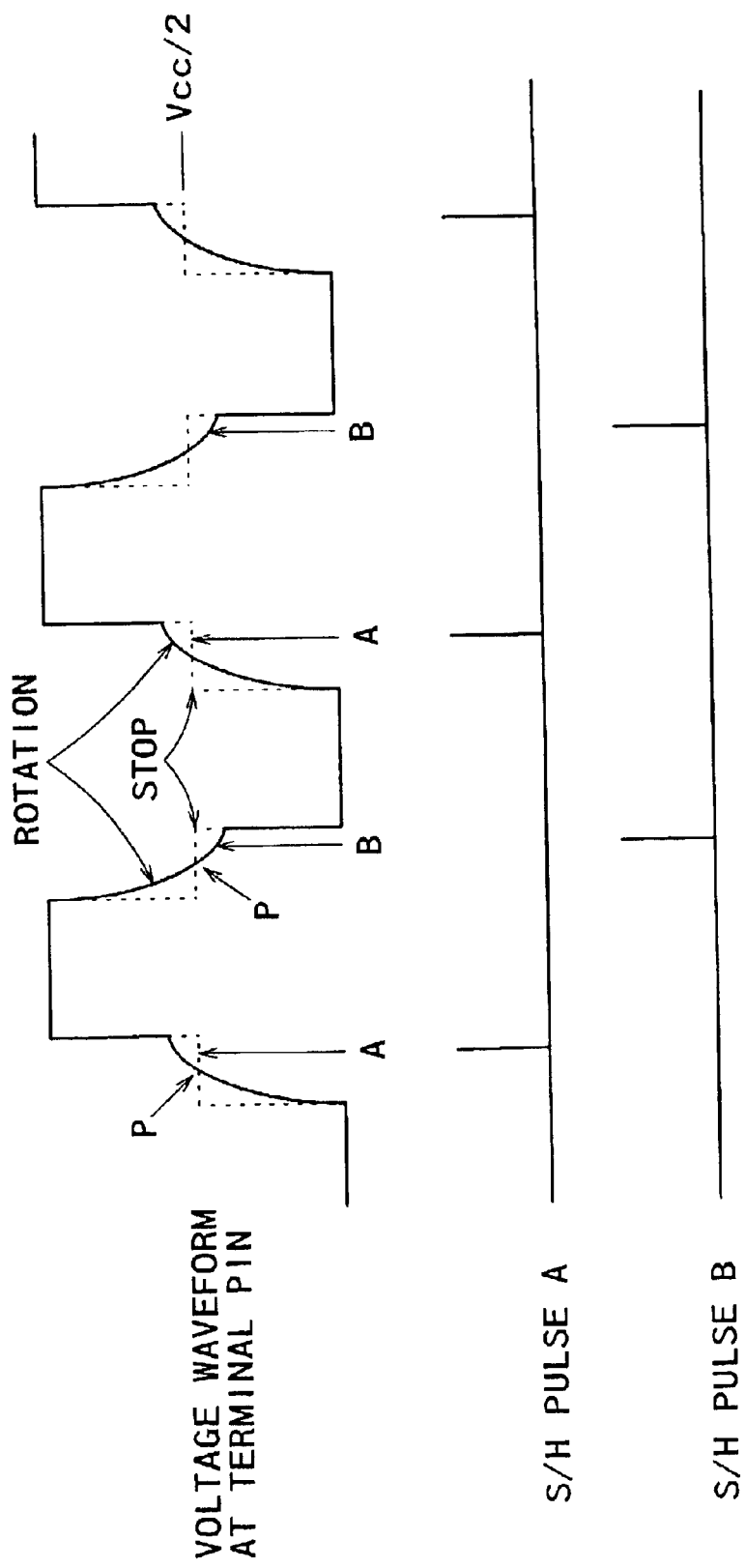
FIG. 5 is a waveform chart explaining the circuit operations of a stop-detection unit.

The circuit workings of the stop-detection unit 16 will now be described with reference to the waveform chart of FIG. 5. What is shown in FIG. 5 is a voltage waveform taken illustratively at the terminal pin 25. With the motor rotating, the terminal pin 25 of the coil U bears a High-level potential when the transistor Qup shown in FIG. 4 is turned on (i.e., conducting), and carries a Low-level potential when the transistor Qun is turned on. When the transistors Qup and Qun are both turned off (i.e., not conducting) a counter-electromotive voltage develops at the terminal pin 25.

In the waveform chart of FIG. 5, solid lines indicate a voltage waveform in effect during motor revolutions. When the motor is stopped, no voltage develops and instead a median potential (about half of Vcc) occurs, as indicated by broken lines. In the meantime, the S/H pulse-generation circuit 36 outputs the S/H pulse signals A and B before or after a cross point P where the voltage waveform in the solid line intersects the median potential. In this example, the S/H pulse-generation circuit 36 outputs S/H pulses A and B slightly after each cross point A at points in time A and B respectively. As a result, the first S/H circuit 52 samples and holds the voltage at the point in time A using the S/H pulse signal A, and the second S/H circuit 53 samples and holds the voltage at the point in time B using the S/H pulse signal B.

The hysteresis comparator 54 compares the hold outputs from the first and second S/H circuits 52 and 53. That is, the comparator 54 compares the hold voltage at the point in time A with the hold voltage at the point in time B. If the motor is rotating, there develops a difference between the two hold voltages at the two points in time. On detecting the voltage difference, the hysteresis comparator 54 judges that the motor is currently rotating and leaves its output terminal open. When the motor is stopped, the hold voltages at the two points in time A and B are both at median potential and there occurs virtually no difference in voltage therebetween. Thus, the virtual absence of a voltage difference prompts the hysteresis comparator 54 to judge that the motor is at rest and to output a Low-level stop-detection signal accordingly.

Discussed below are the circuit workings of the sensorless-type brushless, motor-driving circuit of the above-described embodiment.

A basic concept of this invention is outlined below prior to a specific description of the circuit operations. At time t1 in the timing chart of FIG. 3, the driving-pulse signals UP and VN are High, the other driving-pulse signals VP, WP, UN and WN are Low, and only the transistors Qup and Qvn are turned on. Thus, in the connection diagram of FIG. 4 showing the driving unit 15 along with the coils U, V and W, a current flows from the transistor Qup to the transistor Qvn past the coils U and V, in that order.

The current flowing through the coils U and V generates a driving torque, which is effective only if the rotor is positioned where appropriate. In applications subject to frequent fluctuations of load, phase relations need to be adjusted, as they have been done conventionally with the phase-detection amplifier. The conventional phase-detection amplifier mentioned above was shown detecting phases, giving an output reflecting the detection, and controlling drive in accordance with the detection output.

Motors with relatively few fluctuations in their load, such as fan motors or vibrating motors, need not have their phase relations adjusted when driven. Such motors rotate in correct phase relations when driven simply on the basis of a driving waveform derived from an optimum driving frequency. With that characteristic taken into account, the embodiment of this invention dispenses with the phase-detection amplifier and adopts a synchronizing method whereby the motor is started at an initial rotation frequency in initial operation mode, the frequency being shifted from there toward a constant-speed-rotation-frequency in constant-speed mode.

Specific circuit operations of the inventive brushless motor-driving circuit will now be described. Before power-up or in a standby mode, the motor is at rest and the stop-detection unit 16 outputs a Low-level stop-detection signal. This means the terminal pin 22 (CR connection node of the time-constant circuit 33) is substantially at the ground level. When power is applied or when the standby mode is canceled in order to bring about the initial operation mode, the initial-frequency-determining current circuit 31 outputs an initial current causing the oscillator 36 to oscillate at the initial frequency.

Based on that initial oscillation frequency, the synchronizing-waveform-generation circuit 38 generates the driving-pulse signals UP, VP, WP, UN, VN and WN. Given these driving-pulse signals, the driving unit 15 drives the three-phase coils U, V and W causing the motor (i.e., its rotor) to start rotating at a low rotating speed corresponding to the initial oscillation frequency. With the motor started up, the stop-detection unit 16 judges that the motor is in motion, stops outputting the Low-level stop-detection signal, and leaves the output terminal of the unit open.

With the Low-level stop-detection signal having thus disappeared, the potential at the terminal pin 22 rises gradually in keeping with the time-constant of the time-constant circuit 33. Concurrently, as shown in FIG. 2, the constant-speed-frequency-determining current circuit 34 outputs a control current that rises progressively upon elapse of a predetermined time T in accordance with the time-constant of the time-constant circuit 33 before leveling off at a current level IO corresponding to a predetermined constant-speed-rotation frequency. The control current and the initial current from the initial-frequency-determining current circuit 31 are added up by the adder 32 and the sum is fed to the oscillator 36.

That is, the constant-speed-frequency-determining current circuit 34 with its control current causes the generated frequency of the oscillator 36 to change from the initial rotation frequency corresponding to the initial current from the initial-frequency-determining current circuit 31 to the constant-speed-rotation frequency corresponding to the constant rotating speed of the motor. Under drive control of the driving unit 15 during frequency change, the motor is shifted from an initial-operation mode to a constant-speed mode. Because there is little fluctuation of load, the motor keeps rotating at a speed corresponding to the constant-speed rotation frequency output by the oscillator 36 under control of the constant-speed-frequency-determining current circuit 34 without recourse to phase-detection-based control measures.

It might happen that the motor is stopped for such reason as an impact effected on an apparatus containing the motor when the apparatus is hit by an object or is dropped onto the floor. If this happens, the stop-detection unit 16 detects the stopped state of the motor in the manner described above and outputs a Low-level stop-detection signal accordingly. The Low-level signal brings the terminal pin 22 (CR connection node N of the time-constant circuit 33) substantially to ground-level potential. Then the motor is placed in the initial operation mode, as upon cancellation of the standby mode, and is shifted into the constant speed mode as discussed above.

Because the initial-frequency-determining current circuit 31 continuously outputs the initial current, the motor is restarted based on the initial frequency output by the oscillator 36 in keeping with the initial current. Thus restarted, the motor is shifted from the initial operation mode to the constant speed mode in accordance with the generated frequency of the oscillator 36 based on the control current of the constant-speed-frequency-determining current circuit 34. As a result, the motor again rotates at the rotating speed corresponding to the constant-speed-rotation frequency.

The simplest way to apply brakes to the motor in motion is by bringing the driving-pulse signals of different phases into a fixed-phase relation. In conventional setups using the phase-detection amplifier, a special circuit was needed to fix the driving-pulses into a certain phase relation. The additional circuit made the circuit structure more complicated. In the brushless motor-driving circuit of this embodiment, by contrast, the braking switch 17 is installed so as to selectively stop supplying the driving-signal-generation unit 14, located downstream, with the frequency signal based on the generated frequency of the oscillator 36. The signal supply is turned off simply by the braking switch 17 when the latter is fed with an external braking signal through the terminal pin 24. The structure is appreciably simple but effective in braking the motor.

Turning off the braking switch 17 stops feeding the driving-signal-generation unit 14 with the frequency signal based on the generated frequency of the oscillator 36. With the current flowing continuously through the driving transistors in phases for which the frequency signal is cut off (i.e., driving transistors Qup, Qun, Qvp, Qvn, Qwp, Qwn in FIG. 4), the inventive setup makes it possible to brake the rotating motor without the additional use of a specific circuit.

The sensorless-type brushless, motor-driving circuit, used as described in motors with relatively few fluctuations in their load, such as fan motors or vibrating motors, ensures motor revolutions in correct phase relation without adjusting the phases. Once the motor is started based on the initial frequency, the driving circuit causes the generated frequency of the oscillator 12 to change from the initial frequency toward the constant-speed frequency and, thereby, drives the motor in synchronism with the generated frequency. The phase-detection amplifier for detecting the phase of the counter-electromotive voltage is not needed, nor is the filter for removing noises necessary. The inventive driving circuit thus ensures stable motor drive with a very simple circuit structure.

In particular, the inventive circuit structure that dispenses with the phase-detection amplifier eliminates the need for extracting a midpoint voltage (at point O in FIG. 4) from the middle of the coils U, V and W. This means there is no need for the wires that were conventionally installed to tap the midpoint voltage. As a result, the number of wires interposed between the inventive driving circuit and the three-phase motor is reduced to three from the traditional four. Furthermore, one terminal pin is eliminated when the brushless motor-driving circuit is implemented in IC form.

It used to be accepted practice to extract the midpoint voltage. That made motor manufacturers install in each motor a midpoint terminal ensuring extraction of the midpoint potential. Because the brushless motor-driving circuit of this invention eliminates the need for installing the midpoint terminal, the efficiency of motor production is increased that much, and the cost of the motor is reduced correspondingly.

In the inventive brushless motor-driving circuit, the stop-detection unit 16 detects an accidentally-halted state of the motor attributable illustratively to an external impact. The circuits involved are then operated in the same manner as upon cancellation of the standby mode to put the motor in the initial operation mode before shifting it into the constant-speed mode. The motor might be stopped momentarily but can be brought back into the constant speed mode quickly and automatically. This feature makes the brushless motor-driving circuit an optimum choice for driving such applications as fan motors or vibrating motors that pose few problems even if stopped momentarily.

Under the above-described synchronizing scheme, the duty ratio of the driving-pulse signals UP, VP, WP, UN, VN and WN, i.e., the on/off duty ratio of the transistors for driving the three-phase coils U, V and W, can be set arbitrarily as shown by broken lines in FIG. 3. When the on/off duty ratio is interlocked with the supply voltage, the driving torque (quantity) and heat value can be held constant regardless of supply voltage fluctuations. This makes it possible to expand the scope of the motor-supply voltage that may be used.

The sensorless-type brushless, motor-driving circuit of the above embodiment is used advantageously as a motor-driving circuit for driving, in particular, brushless motors, such as fan motors that drive cooling fans in diverse electronic devices including personal computers, and vibrating motors that drive vibrators in portable terminals, such as portable telephones informing their users of an incoming call. However, the inventive driving circuit is not limited only to fan motors and vibrating motors; it can be applied to any kind of brushless motor that has relatively few fluctuations in its load.

Figure 6:
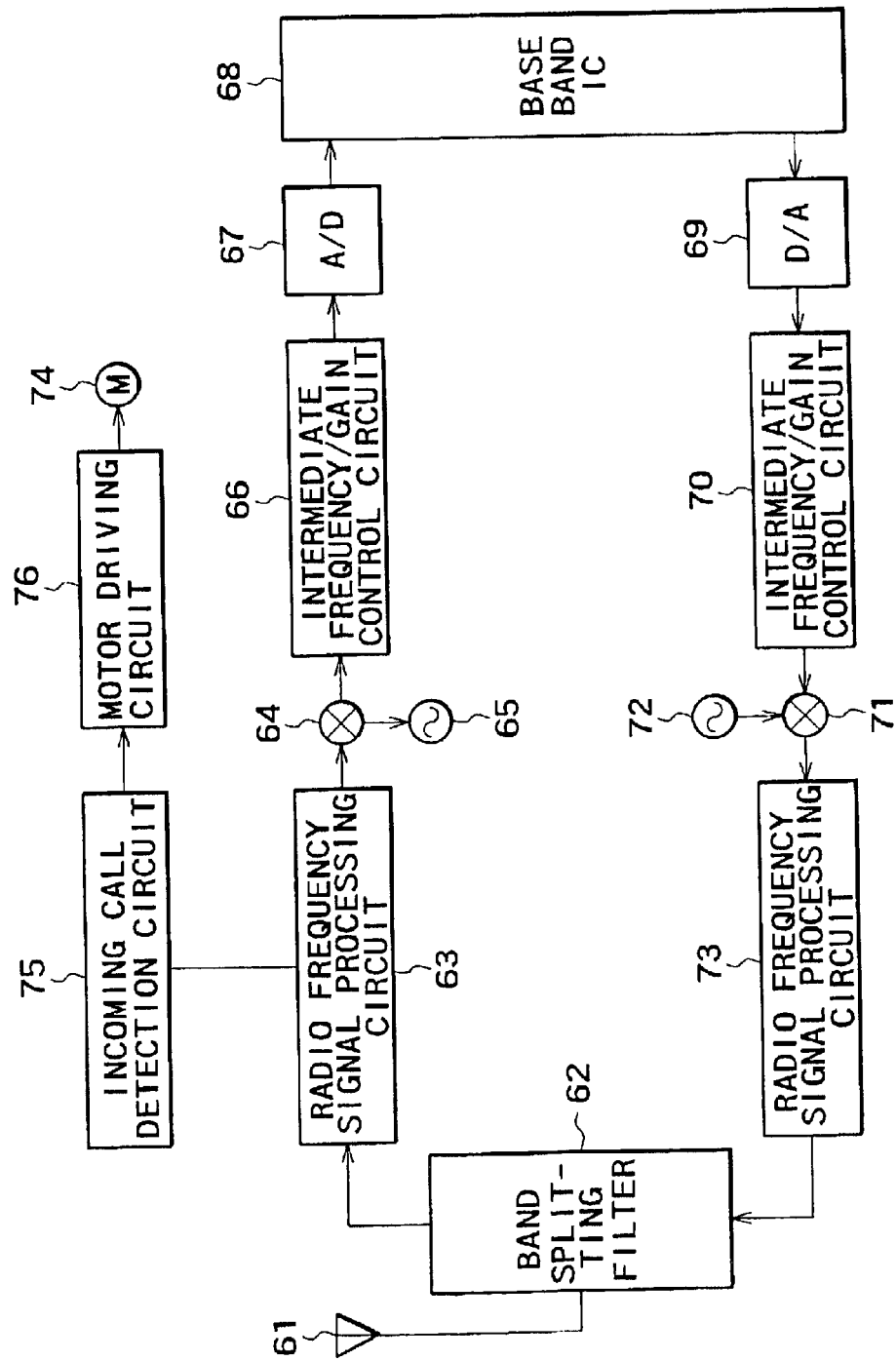
FIG. 6 is a block diagram showing a typical structure of a RF front-end unit in a portable telephone according to the invention.

FIG. 6 is a block diagram showing a typical structure of a RF front-end unit in a portable terminal such as a portable telephone incorporating the sensorless-type, brushless, motor-driving circuit of this invention.

In FIG. 6, radio waves received by an antenna 61 are forwarded through a band-splitting filter 62 used for both transmission and reception purposes. The filtered signal is processed suitably by a radio-frequency-signal-processing circuit 63 before being fed to a mixer 64. The mixer 64 mixes the received signal with a locally-generated frequency from a local oscillator 65 for conversion into an intermediate frequency (IF). After the conversion, the intermediate frequency is subjected to signal processing, such as quadrature amplitude demodulation, by an intermediate frequency/gain control circuit 66. The processed signal is put into digital format by an A/D converter 67, and the digital signal is fed to a base-band IC 68.

On the transmitting side, a digital IF signal supplied from the upstream base band IC 68 is put into analog format by a D/A converter 69. The analog signal is subjected to signal processing, such as quadrature amplitude modulation, by an intermediate frequency/gain control circuit 70. The processed signal is forwarded to a mixer 71 wherein the signal is mixed with a locally-generated frequency from a local oscillator 72 for conversion into a RF signal. The RF signal is processed suitably by a radio-frequency-signal-processing circuit 73 before being fed to the band-splitting filter 62. From the band-splitting filter 62, the signal is sent to the antenna 62 that transmits the signal as radio waves.

Portable terminals, such as portable telephones, generally supplement their usual function of audibly announcing an incoming call with a vibrator function that informs the user of an incoming call through vibrations, so as not to disturb the people nearby. The vibrator is driven by a vibrating motor acting as a vibration source. The above-mentioned portable telephone according to the invention incorporates a vibrating motor 74 that transmits vibrations to the enclosure of the telephone. The vibrating motor 74 can be implemented advantageously by a sensorless-type, brushless motor which, without using position sensors, helps render the host apparatus (i.e., portable telephone) smaller in size and more economical than before.

Returning to FIG. 6, an incoming-call-detection circuit 75 detects an incoming call based on a RF signal supplied from the radio-frequency-signal-processing circuit 63 and sends an incoming-call-detection signal to a motor-driving circuit 76. Given the incoming-call-detection signal from the incoming-call-detection circuit 75, the motor-driving circuit 76 drives the driving motor 74 accordingly. The motor-driving circuit 76 is implemented by the brushless motor-driving circuit of the above-described embodiment. In this setup, the incoming-call-detection signal from the incoming-call-detection circuit 75 is given as a standby-off (i.e., cancel) signal to the brushless motor-driving circuit shown in FIG. 1.

As described above, the inventive brushless motor-driving circuit used as the driving circuit 76 of the vibrating motor 74 vibrating the telephone enclosure constitutes an appreciably simplified circuit structure for stable motor drive. Because the motor-driving circuit 76 can be minimized in design, the inventive circuit is best suited for portable telephones that have a tendency to become smaller in size over time.

Since there is no need to extract the midpoint voltage from the vibrating motor 74, the advantage of the invention is not limited to the simplified circuit structure alone. The additional benefits include: a reduced number of wires between the vibrating motor 74 and the motor-driving circuit 76; simplified wiring work thanks to the lowered wire count; and a diminished cost for the motor itself because there is no need to tap the midpoint terminal in the vibrating motor. These features add up to significantly helping the portable telephone become smaller in size and less expensive than ever.

If the motor in unadjusted phase relation is stopped illustratively due to an external impact, the brushless motor-driving circuit of the above-described embodiment immediately detects the stopped state of the motor and puts the motor into the initial operation mode before bringing the motor automatically back into the constant-speed mode. For example, even if the vibrating motor 74 is temporarily halted with the portable telephone accidentally dropped on the floor, the vibrating motor 74 is automatically brought back into constant speed mode by the time the user picks up the telephone. In this manner, the user feels no inconvenience in making use of the incoming-call announcing function of the telephone.

Although the inventive driving circuit has been described as applicable primarily to the portable telephone, this is not limitative of the invention. The invention can be applied to any portable terminal that has a vibrator function employing a vibrating motor as the vibration source.

In the above-described, sensorless-type, brushless, motor-driving circuit according to the invention, once the motor is started based on the initial frequency, the generated frequency of the oscillator is changed progressively from the initial frequency toward the constant-speed-frequency. The motor is driven in synchronism with the frequency thus generated. These arrangements eliminate the need for the phase-detection amplifier that detects the phase of the counter-electromotive voltage or for the filter for removing noises. The inventive circuit thus ensures stable motor drive with an appreciably-simplified circuit structure.

Because the inventive brushless motor-driving circuit has no need for the phase-detection amplifier, it is not necessary to extract the midpoint voltage of coils having a plurality of phases in the motor. This eliminates the need for the wires that were conventionally installed for this purpose. With the reduced number of wires between the driving circuit and the motor, wiring work is simplified correspondingly. An additional advantage is that one terminal pin becomes unnecessary when the driving circuit is implemented in IC form.

As many apparently different embodiments of this invention may be without departing from the spirit and scope thereof, it is to be understood that the invention is not limited to the specific embodiments thereof except as defined in the appended claims.

What is claimed is:

1. A brushless motor-driving circuit comprising:
   initializing means setting an initial rotating speed;
   oscillating means for generating a frequency corresponding to said initial rotating speed set by said initializing means;
   frequency-controlling means for causing the frequency generated by said oscillating means to change from the frequency corresponding to said initial rotating speed to a frequency corresponding to a constant rotating speed;

driving-signal-generating means for generating driving signals having a plurality of phases based on the generated frequency of said oscillating means;

driving means for driving coils having a plurality of phases based on said driving signals having said plurality of phases generated by said driving-signal-generating means; and braking means for selectively blocking the supply of said generated frequency of said oscillating means to said driving-signal-generating means.

2. A brushless motor-driving circuit according to claim 1, wherein said frequency-controlling means includes a time-constant circuit for providing a time-constant, said frequency-controlling means causing said generated frequency of said oscillating means to change in accordance with said time-constant.

3. A brushless motor-driving circuit according to claim 1, further comprising detecting means for detecting a rotating state of a brushless motor based on a counter-electromotive voltage generated by one of said coils having said plurality of phases.

4. A brushless motor-driving circuit according to claim 3, wherein, on detecting a stopped state of said brushless motor, said detecting means resets the processing of said frequency-controlling means.

5. A brushless motor-driving circuit according to claim 1, wherein said driving means changes an on/off duty of driving transistors depending on a supply voltage for driving a brushless motor.

6. A portable terminal incorporating a vibrating motor for vibrating an enclosure and a motor-driving circuit for driving said vibrating motor upon receipt of an incoming call, wherein said motor-driving circuit comprises:

initializing means setting an initial rotating speed;

oscillating means for generating a frequency corresponding to said initial rotating speed set by said initializing means;

frequency-controlling means for causing the frequency generated by said oscillating means to change from the frequency corresponding to said initial rotating speed to a frequency corresponding to a constant rotating speed;

driving-signal-generating means for generating driving signals having a plurality of phases based on the generated frequency of said oscillating means;

driving means for driving coils having a plurality of phases based on said driving signals having said plurality of phases generated by said driving-signal-generating means; and braking means for selectively blocking the supply of said generated frequency of said oscillating means to said driving-signal-generating means.

7. A portable terminal according to claim 6, wherein said frequency-controlling means comprises a time-constant circuit for providing a time-constant, and said frequency-controlling means causes said generated frequency of said oscillating means to change in accordance with said time-constant.

8. A portable terminal according to claim 6, further comprising detecting means for detecting a rotating state of said vibrating motor based on a counter-electromotive voltage generated by one of said coils having said plurality of phases, wherein, on detecting a stopped state of said vibrating motor, said detecting means resets the processing of said frequency-controlling means.

9. A portable terminal according to claim 6, wherein said driving means changes an on/off duty of driving transistors depending on a supply voltage for driving said vibrating motor.

* * * * *